United States Patent [19]

Gaylinn

[11] Patent Number: 5,738,044
[45] Date of Patent: Apr. 14, 1998

[54] MULTIPLEXED GANGABLE ANIMAL BATHING STATIONS

[76] Inventor: Glen Philip Gaylinn, 35 M Aher Dr.. Norwalk, Conn. 06850

[21] Appl. No.: 612,659

[22] Filed: Jan. 25, 1996

[51] Int. Cl.$^6$ ................................................ A01K 13/00
[52] U.S. Cl. ...................... 119/671; 119/665; 119/669; 4/596; 4/612
[58] Field of Search .................... 119/673, 665, 119/671, 667, 669; 4/596, 597, 612, 613, 615, 601

[56] References Cited

U.S. PATENT DOCUMENTS

| | | | |
|---|---|---|---|
| 1,416,270 | 5/1922 | Deming | 4/596 |
| 3,175,534 | 3/1965 | Pollard | 119/1 |
| 3,583,368 | 6/1971 | Mandelbaum | 119/152 |
| 3,596,636 | 8/1971 | Stobaugh | 119/1 |
| 3,683,512 | 8/1972 | Beam, Jr. | 34/243 |
| 3,711,872 | 1/1973 | Jarosinski | 4/146 |
| 3,884,191 | 5/1975 | Stout | 119/671 |
| 4,253,203 | 3/1981 | Thomas | 4/612 |
| 4,424,598 | 1/1984 | Cima | 4/612 |
| 4,566,142 | 1/1986 | Roberts et al. | 4/604 |
| 4,930,453 | 6/1990 | Laliberte | 119/158 |
| 4,938,169 | 7/1990 | Barmakian | 119/83 |
| 4,947,799 | 8/1990 | Parker | 119/83 |
| 4,987,619 | 1/1991 | Smith | 4/612 |
| 5,213,064 | 5/1993 | Mondine et al. | 119/671 |

FOREIGN PATENT DOCUMENTS 2270456  3/1994  United Kingdom ............... 119/665

*Primary Examiner*—John G. Weiss
*Assistant Examiner*—Bruce E. Snow
*Attorney, Agent, or Firm*—Cobrin Gittes & Samuel

[57] ABSTRACT

Single or gangable multiplexed animal bathing stations comprise a rearward sloped wash platform between two side courtesy walls, along with a back splash wall and a rearward sloped floor. A wash platform—back splash wall drainage gap G improves drainage, cleanliness and efficiency, along with rearward tilted station floor angles $\beta_{floor}$ and wash platform angles $\beta_{platform}$, which improve drainage and animal-groomer stance. Gangable animal bathing stations are disclosed that share common walls and effluent processing for passage to a central waste filtration and treatment means.

2 Claims, 4 Drawing Sheets

MULTIPLEXED GANGABLE ANIMAL BATHING STATIONS

BACKGROUND OF THE INVENTION

This invention relates to bathing apparatus for animals, and more particularly, to a novel construction for multiplexed or gangable animal bathing stations. Emphasis in this disclosure is on gangable multiplexed animal bathing stations optimized for the washing, conditioning, and drying of all species of dogs. However, as will be evident, the teaching presented here can be applied to animal bathing stations generally.

In animal grooming salons, sanctuaries and zoos, it has long been common practice to make use of dedicated baths, tubs and bathing stations to facilitate the proper and efficient bathing, conditioning and drying of animals. Grooming and cleaning of animals pose special challenges, particularly when time is at a premium and/or relatively untrained personnel are relied upon to execute the grooming steps unsupervised. While there are bathing tubs and stations available, they are expensive, and suffer from the following limitations:

[1] Difficulty in mounting or dismounting onto or from the platform or sink for the animal and for the groomer, who must often lift the animal unto the tub or sink area for washing, etc;

[2] Splatter and floating of airborne hair outside of the bathing station during the grooming steps due to lack of high walls and proper confinement of the bathing area;

[3] Fear among animals of the confined spaces found in most groomers, because the platform where the animal rests is typically surrounded by close walls. The nature of the seating is unfamiliar, resembling that of a sink or tub instead of a small house or room;

[4] Station or tub seating which by its construction and configuration does not urge the animal to remain seated;

[5] Accumulation of debris and hair, both on the floors and on the cleaning surfaces of animal bathing tubs or stations, which often requires that the groomer undertake a separate process step of cleaning the hair and other debris from the bathing surfaces and cleaning the tub, stall or station, including floor drains;

[6] Difficulty in providing an inexpensive means for efficiently ganging and multiplexing multiple stations for simultaneous bathing service, sharing common walls and utilities, while discouraging apprehensive behavior which results when an animal interacts adversely with other animals being bathed.

Accordingly it is an object of this invention to make the mounting of the animal to eye-level or nearly eye-level using a platform in a convenient location for the groomer and animal.

It is another object of this invention to provide high wall containment of splatter and floating airborne hair to the animal bathing station.

It is another object of this invention to provide station seating which naturally urges the animal to remain seated.

It is yet another object of this invention to give an animal bathing station which by its construction prevents accumulation of debris and hair, with no separate substantial process step required to clean hair and debris from the bathing and confinement surfaces and floor drains.

It is yet another object of this invention to provide an inexpensive configuration which allows for efficiently ganging and multiplexing of multiple animal bathing stations for simultaneous bathing service.

It is yet another object of this invention to reduce or eliminate entirely fearful, combative or apprehensive behavior on the part of animals who interact with other animals bathed in adjacent stations or stalls by using a familiar station geometries and providing substantial acoustic and line-of-sight isolation from other animals.

SUMMARY OF THE INVENTION

According to the present invention, an animal bathing station to accommodate an animal during bathing steps wherein waste water and debris is generated and processed, is realized by providing a station floor in conjunction with left and right side courtesy walls and a back splash wall, and further comprising a wash platform situated at a distance from the back splash wall so as to allow a drainage gap (G) capable of allowing effective drainage of the waste water and debris from the wash platform. A drainage means is set in the rear end of the station floor to allow effective drainage of said waste water and debris therefrom.

The concept may be extended to multiplexed animal bathing stations, using multiple individual ganged animal bathing stations of similar construction. In one embodiment, left and right side courtesy walls are affixed to a common station floor with a central courtesy wall located between the left and right side courtesy walls. A common back splash wall is shared, along with a drainage means set in the rear end of the common station floor to allow effective drainage of the waste water and debris from first and second wash platforms on the common station floor. In another preferred embodiment, the drainage means is a waste water canal located at the rear end of the common station floor, with necessary apertures in the courtesy walls to allow simultaneous multiplexed drainage of waste water from all stations.

Further embodiments include specifying station floor angle $\beta_{floor}$, waste canal slope angle $\beta_{canal}$ for improved drainage and cleanliness, and a wash platform angle $\beta_{platform}$ for improved drainage, cleanliness, and stance of the groomer/operator as well as that of the groomed animal.

Figure 1:
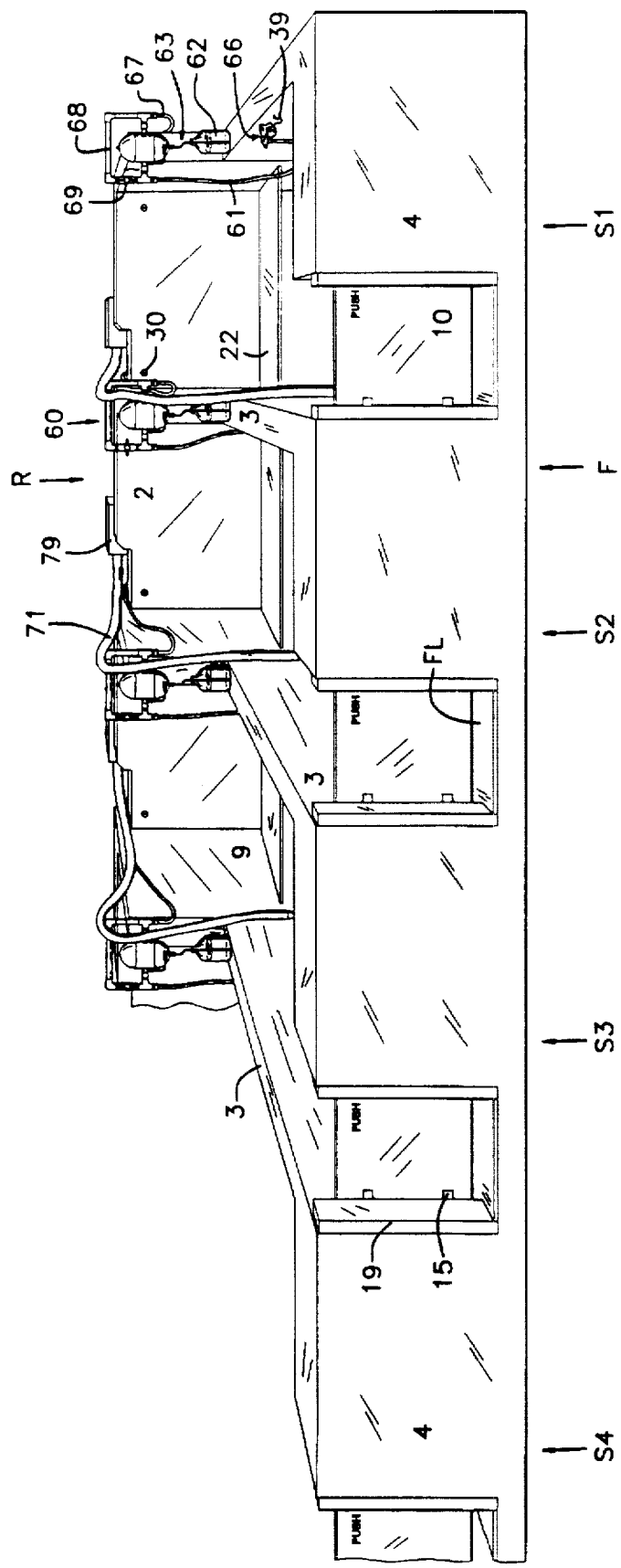
FIG. 1 shows a parallel perspective surface view of a multistation ganged structure, showing three complete individual ganged multiplexed animal bathing stations and a portion of a fourth.

| Schedule of Reference Characters | |
|---|---|
| FL | station floor |
| 2 | back splash wall |
| 3 | extended side wall |
| 4 | front wall |
| 9 | side courtesy wall |
| F | station front |
| R | station rear |
| S1 | animal bathing station |
| S2 | animal bathing station |
| S3 | animal bathing station |

5,738,044

-continued

| Schedule of Reference Characters | |
|---|---|
| S4 | animal bathing station |
| 10 | one-way entrance door |
| CO | entrance door cutout |
| 15 | door hinge and spring assembly |
| 19 | door stop bars |
| 20 | wash platform supports arms |
| 21 | wash platform frame rails |
| 22 | wash platform |
| 25 | wash platform hinge assembly |
| G | wash platform - back splash wall drainage gap |
| 30 | animal anchor hooks |
| 39 | accessory hooks |
| 60 | soap/water mixer |
| 61 | gun hose |
| 62 | soap supply |
| 63 | soap inake line |
| 66 | wash gun |
| 67 | tempered water supply |
| 68 | rinse bypass |
| 69 | rinse bypass valve |
| 71 | dryer hose |
| 79 | hot air dryer |
| 90 | canal pass-through aperture |
| 91 | waste water canal |
| $\beta_{platform}$ | wash platform angle |
| $\beta_{floor}$ | station floor angly |
| $\beta_{canal}$ | waste canal slope angle |

DETAILED DESCRIPTION OF THE INVENTION

Figure 2:
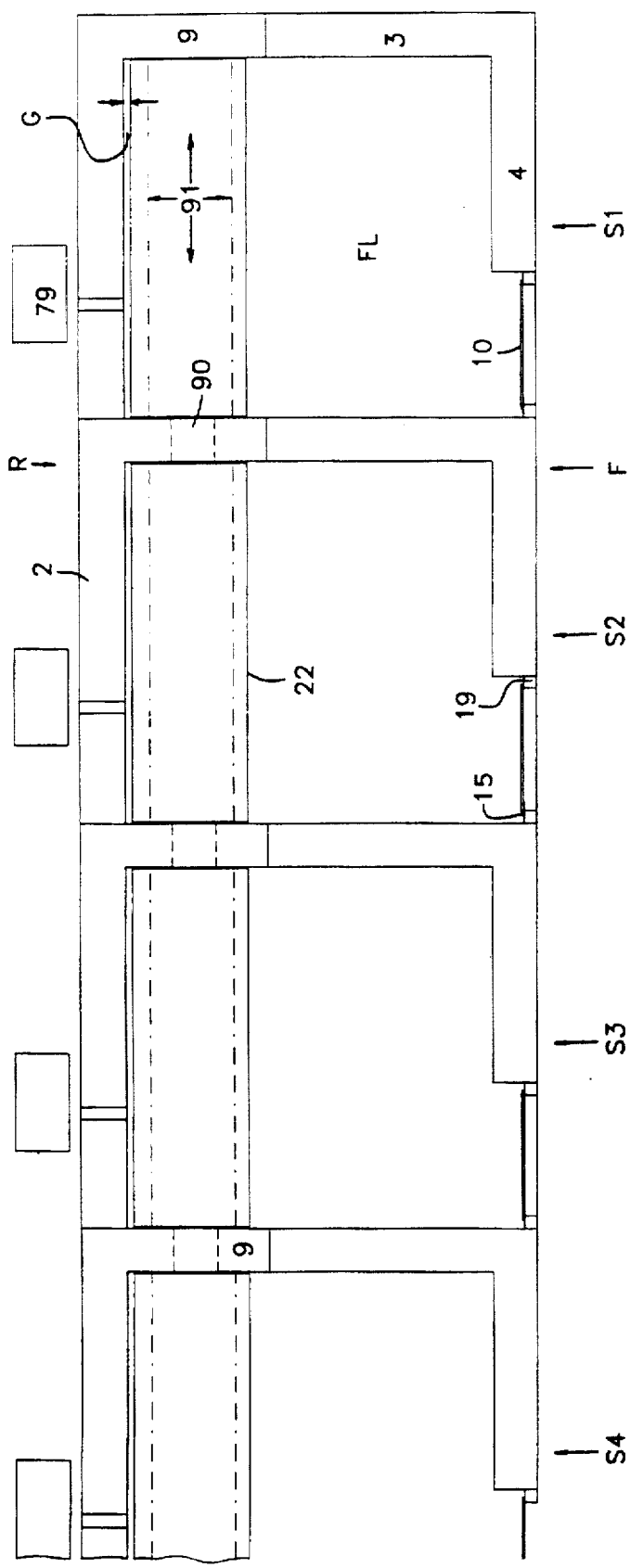
FIG. 2 shows a cross-sectional top view of the animal bathing stations as shown in FIG. 1.

Referring to FIGS. 1 and 2, there is shown a multistation ganged structure, revealing three complete individual ganged multiplexed animal bathing stations and a portion of a fourth. FIGS. 1 and 2 show a parallel perspective surface view and a cross-sectional top view, respectively. Animal bathing stations S1, S2, S3, and S4, each possess individual or shared walls and floor; namely station floor FL, back splash wall 2, extended side wall 3, front wall 4, and side courtesy wall 9. Each animal bathing station has a front end F and a rear end R. The side courtesy wall 9 and extended side wall 3 are generally integral with each other, but the side courtesy wall 9 has a greater height to confine splash, waste water and debris, and to isolate the animal acoustically and visually from other animals being bathed. Side courtesy walls 9 that are located between two adjacent animal bathing stations, e.g., between animal bathing stations S2 and S3 are to be considered as one central (shared) wall. Installed within each front wall 4 is one-way entrance door 10 hung using door hinge and spring assembly 15 and door stop bars 19 permanently affixed to, or integral with front wall 4.

In practice, the animal to be bathed is led by the groomer through one-way entrance door 10 and is prompted gently to hop onto a wash platform 22, which is affixed to both left and right side courtesy walls 9 in a manner described below. Animal anchor hooks 30 are provided in back splash wall 2 to allow a leash or anchor line to be attached thereto.

The back splash wall 2, extended side wall 3, front wall 4, and side courtesy wall 9 may be completely integrated as one wall or assembly, and may be constructed of a variety of known materials, as in known in art. Liners may be installed in the vicinity of wash platform 22 to facilitate cleaning—particularly suitable for this purpose is corrugated reinforced polypropylene sheets of 4 mm or 8 mm sheet thickness which may be attached to the wall in question using conventional means. The animal bathing stations may be fabricated individually and joined using techniques known in the art. Alternatively, the various walls and the floor may be built from cement, brick, wood, or other materials.

In each animal bathing station, there is provided a soap/water mixer 60 which provides a steady supply of premixed detergent solution for bathing. The soap/water mixer 60 obtains temperature controlled water from tempered water supply 67, while also drawing as needed from soap supply 62 via soap intake line 63. The soap/water mixer 60 functions to provide under pressure a precise soap/water mix, for all flow and temperature conditions, to gun hose 61 and a trigger-operated wash gun 66. The operation and construction of soap/water mixer 60 is known in the art, and such systems are widely used. Wash gun 66 allows small partial flows and variable spray patterns that are useful for the various parts of the wash cycle: [1] wet down; [2] fur agitation; [3] fur soap down; [4] fur scrub; [5] animal rinsing; and [6] cleaning the station floor FL, wash platform 22, walls, and other surfaces. A main advantage of such a mixer system is that the soap is easily applied, and the animal easily washed, while leaving one hand free to master the animal. All stations share a common temperature-regulated water line, not shown, that supplies each tempered water supply 67 with clean water at a preset temperature. The optimal water supply temperature for bathing dogs has been found to be 86°–94° Fahrenheit.

When the washing cycle has been completed, a rinse cycle using the above wash gun 66 is made possible by use of rinse bypass 68 and rinse bypass valve 69. When rinse bypass valve 69 is opened, tempered water supply 67 is allowed to bypass the entire soap/water mixer 60 via rinse bypass 68, feeding the wash gun 66 directly with clean water. When a soap/water solution for washing is desired at wash gun 66, the rinse bypass valve 69 may be closed. When finished using wash gun 66, it may be holstered or retained by one of accessory hooks 39.

The soap/water mixer 60 and associated components are available commercially. One such unit is the Champion® Groomer manufactured by Chemilizer™ Products, Inc., located at 12745 49th Street, Clearwater, Fla., U.S. It is a non-electrically operated, self-functioning unit which can provide up to 11 gallons per minute, using a preset soap/water mix rate of either 1 oz or 2 oz liquid soap to one gallon of water from tempered water supply 67. To accomplish the soap-water mixing, incoming water from tempered water supply 67 drives a turbine inside the soap/water mixer 60. The turbine in turn drives a piston-operated pump that draws up soap from soap supply 62 for mixture with water from tempered water supply 67. Presently available units also allow that a fur conditioner may be applied through the soap/water mixer 60 instead—the operation will be the same, without departing from the scope of the invention. For a setup using both liquid soap and liquid fur conditioner, there would be provided two reservoirs similar to soap supply 62, with the needed valving to switch from soap to conditioner and vice versa.

Each animal bathing station is also provided with hot air dryer 79, mounted in a conventional manner to the rear side of back splash wall 2 (not shown). Hot air dryer 79 exhausts heated air to dryer hose 71, which is shown draped in storage over the top of rinse bypass 68. After the above washing steps are completed, the animal may be hose-dried in a conventional manner and the dryer hose may also be used to dry off the walls, floor and wash platform 22.

FIG. 2 shows a top view of wash platform 22 where an important feature is shown, namely, the existence of a wash platform—back splash wall drainage gap G, as shown in animal bathing station S1. This gap is typically 20–30 mm allowing waste water, hair, and debris to fall through the gap to the floor instead of collecting on wash platform 22. Any G may be used, depending upon the width and composition of the debris encountered, and upon the water flow rates. In the station floor FL at the rear of the animal bathing station are established a waste water canal 91 and canal pass-through apertures 90, shown in a top hidden view through the wash platform 22. These features will be discussed in greater detail below.

Figure 3:
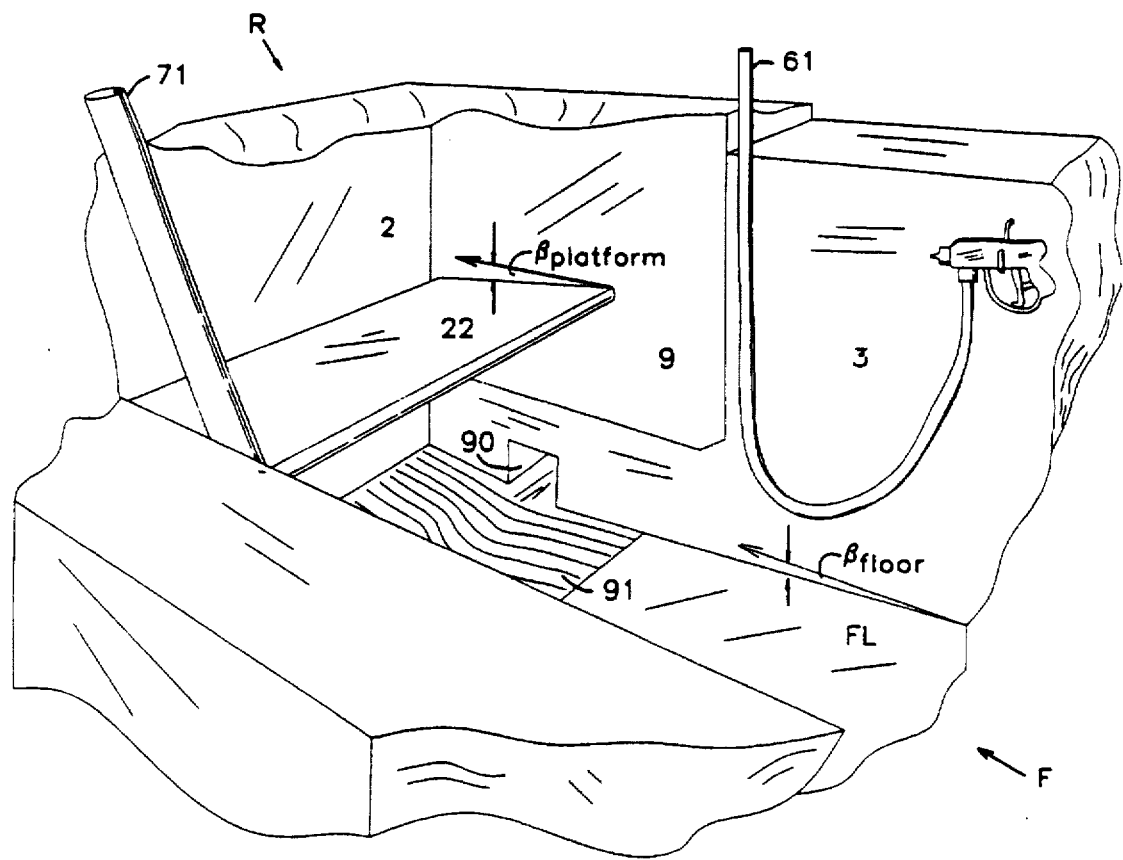
FIG. 3 shows an angular perspective surface view of a portion of a typical animal bathing station, highlighting the waste water canal, the wash platform, and the animal bathing station floor.
Figure 4:
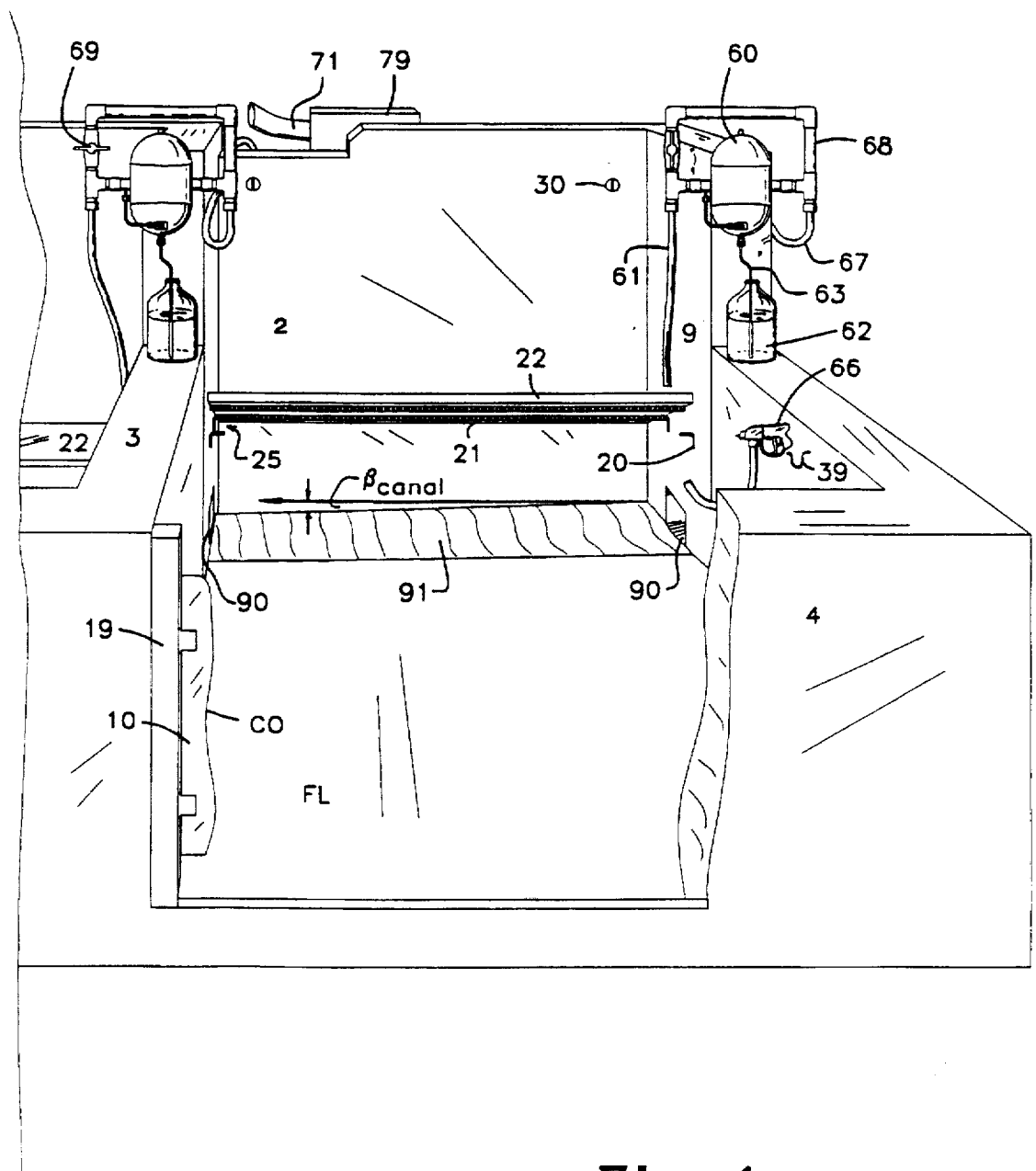
FIG. 4 shows a close-up parallel perspective surface view of a portion of the ganged animal bathing station as seen through a cutout in the area of the entrance door, and with the front end of the wash platform shown in a lifted position.

Now referring to FIG. 3, which shows a close-up angular perspective surface view of a portion of a typical animal bathing station; and FIG. 4, which shows a close-up parallel perspective surface view of a portion of the ganged animal bathing station as seen through a cutout CO in the area of the entrance door—additional important features are shown and described.

In FIG. 3, a close-up view of the lower rear portion of an animal bathing station reveals a waste water canal 91 situated under the wash platform 22 for carrying away waste water, hair and debris. The waste water canal 91 may be oriented to exhaust its load to the left or to the right via canal pass-through aperture 90 inside side courtesy wall 9. As can be seen in this figure, a liner has been affixed to side courtesy wall 9 to facilitate drainage and cleaning. Additionally, the station floor FL is sloped with respect to the horizontal to a station floor angle $\beta_{floor}$ to allow gravity feeding of waste water or rinse water away from the operator standing to the front of wash platform 22 into the waste water canal 91. Station floor angle $\beta_{floor}$ has been found effective between 10° and 12°, but any substantial angle will allow effective, effortless drainage of the station floor FL. If, during a wash, clumps of fur or debris fall to the station floor, the groomer can wash down the station floor FL using wash gun 66 without the need for direct scrubbing or sweeping of the floor. Another advantage of a sloped station floor FL is that it puts the station operator or groomer in a slight forward stance with respect to the animal being bathed, allowing greater control over the animal, increasing bathing efficiency and productivity.

Another important feature of this invention is the wash platform 22, which may be constructed from ¾" marine plywood or other well known materials. Black rubber sheet may be used to form a replaceable liner on the service portion of wash platform 22. Much improved results have been obtained via trial and error by having the wash platform 22 ordinarily sloped rearward with respect to the horizontal by a wash platform angle $\beta_{platform}$, with the optimal angle found to be between 10° and 12°, as shown in FIG. 3. Having the wash platform 22 angled rearward 10°–12° has been found not only to allow effective drainage and sweeping away of waste water and hair—without the need for stopping work to specifically spray it off—but it also provides a stabilizing force that keeps the animal on the platform, rather than attempting to "rush" the operator or to try to walk or jump off. The angled platform, in effect, induces a sense of calmness and acceptance in the animals washed.

If desired, the wash platform 22 may be hinged and removable, as shown in FIG. 4. In this figure, wash platform 22 is shown in a tilted up position, which facilitates removal and cleaning. Wash platform 22 is supported by four wash platform support arms 20 affixed or held by both left and right side courtesy walls 9. Wash platform support arms 20 are affixed to the side courtesy walls 9 using any number of fastening means known in the art, such as concrete anchors. Wash platform 22 is hingeably supported by two wash platform frame rails 21, with the rearward frame rail 21 incorporating a conventional wash platform hinge assembly 25 that allows the tilting as shown and total removal of wash platform 22 if desired. Different support arrangements for the wash platform 22 may be substituted, with the platform supported by support arms fixed to only one of either the left or right side courtesy wall 9; alternatively the wash platform 22 may be supported either by the back splash wall 2 or the station floor FL.

It has been found that the waste water canal 91 functions satisfactorily when set at a waste canal slope angle $\beta_{canal}$ with respect to the horizontal, as shown, to allow gravity feeding of the individual effluents from each animal bathing station down the canal. This multiplexes the effluents from each station, greatly simplifying the maintenance of the stations because it allows use of only one waste treatment and/or filtration means (not shown) and a single treated discharge (not shown). An effective waste canal slope angle $\beta_{canal}$ is 5°, but any substantial angle will perform satisfactorily. If desired, the waste water canal 91 may be made integral with the station floor FL, such as when plastic panels are used to form the station structure.

In addition, one may change the direction of the wash platform 22 slope, electing, for example, to have the wash platform 22 drain to the side toward side courtesy wall 9.

Multiplexed animal bathing stations according to the present invention may be modular in construction, using easily assembled panels or walls of any reasonable thickness, using any number of structural materials as is known in the art, including resin, plastic, metal, glass, or composite structures. They may ganged together using conventional fasteners, and without need for elaborate or expensive waste plumbing. Ground fault interrupter-protected electrical receptacles may be provided, as well any number of signaling or monitoring devices to aid in animal handling or control. Any number of animal bathing stations may be ganged together, and the configurations employed may be varied—for example, the stations may be arranged in a circular arrangement in lieu of the linear one shown here—without departing from the scope of the invention. Pentagonal or quadrant arrangements of the animal bathing stations may be used as well. Alternatively, the multiplexed animal bathing stations may be placed back to back (rear section R of one station joined with rear section R of another station), with common sharing of a double width waste water canal 91, with joined canal pass-through apertures 90. In addition, the invention may be practiced using only some of the angles and features mentioned above.

Using a station structure that allows the groomer to occupy the same type of physical space as the animal or pet, a sense of calmness is induced in the animal when contrasted to a bathing arrangement whereby an animal is thrust into a tub or sink type of enclosure. The front wall 4, side courtesy wall 9, extended side wall 3 and one-way entrance door 10 all serve to isolate successfully the bathed animal from distractions and threats from animals, noise, etc. By using shared walls and utilities, the cost per station is driven down.

In interpreting the appended claims, it is important to note that as the claims are written, the word "water"—as in the water the animal is bathed with, or the waste water that results from bathing processes in the animal bathing station (s)—is a general term, and that it is intended here that liquids or even solids (e.g., sand, particulates) may be substituted in lieu of water for bathing or even drying.

Obviously, many modifications and variations of the present invention are possible in light of the above teaching. It is therefore to be understood, that within the scope of the appended claims, the invention may be practiced otherwise than as specifically described or suggested here.

I claim:

1. An animal bathing station, comprising:

a multistation structure having multiple bathing stations each sharing a common station floor with a rear end and a front end and sharing a common back splash wall affixed to and extending upwardly from said rear end of said common station floor, each of said bathing stations having courtesy walls spaced apart from each other and affixed to said common station floor and said back splash wall, said courtesy walls extending between said rear and front ends and each having an extended side wall that terminates above said common station floor at an elevation that is higher than an elevation of an adjacent remainder of said courtesy walls so as to confine splash, waste water and debris and is opaque to isolate acoustically and visually adjacent ones of said multiple bathing stations from each other;

a platform spaced above said common station floor and affixed to and extending between two of said extended side walls and separated from said common back splash wall by a gap dimensioned to allow waste water, hair and debris arising from washing the animal to fall through the gap to said common stationary floor instead of accumulating on said platform, said platform being angled rearward toward said back splash wall and downward toward said common station floor; and drainage set in the rear end of said station floor to allow effective draining of the waste water, hair and debris that falls down through the gap onto said stationary floor, said stationary floor being angled to slope downwardly toward said drainage.

2. A station as in claim 1, further comprising:

animal anchor hooks affixed to said back splash wall and to which may be tied any one of a leash and an anchor line;

a one-way entrance door affixed to at least one of said courtesy walls and said common stationary floor and extending along said front end of said stationary floor and facing opposite said back splash wall;

any one of a soap/water mixer and fur conditioner located proximate said platform;

at least one wash platform support arm on which said platform is hingeably and removably mounted, said arm being fixed to at least one of said courtesy walls, said common back splash wall and said common station floor;

said drainage including a waste water canal set in said common station floor and a canal pass-through aperture situated in at least one of said courtesy walls.

* * * * *